United States Patent
Bryan et al.

(10) Patent No.: US 7,895,625 B1
(45) Date of Patent: Feb. 22, 2011

(54) SYSTEM AND METHOD FOR RECOMMENDING PROGRAMMING TO TELEVISION VIEWING COMMUNITIES

(75) Inventors: David Alan Bryan, Carmel, NY (US); Gilles Boccon-Gibod, Los Altos, CA (US)

(73) Assignee: Time Warner, Inc., New York, NY (US)

( * ) Notice: Subject to any disclaimer, the term of this patent is extended or adjusted under 35 U.S.C. 154(b) by 1237 days.

(21) Appl. No.: 10/990,223

(22) Filed: Nov. 16, 2004

Related U.S. Application Data

(63) Continuation-in-part of application No. 10/746,809, filed on Dec. 24, 2003.

(51) Int. Cl.
H04N 5/445 (2006.01)
H04N 7/173 (2006.01)
G06F 13/00 (2006.01)
G06F 3/00 (2006.01)

(52) U.S. Cl. .............................. 725/46; 725/86; 725/98
(58) Field of Classification Search ................... 725/86, 725/98
See application file for complete search history.

(56) References Cited

U.S. PATENT DOCUMENTS

| | | | |
|---|---|---|---|
| 5,255,090 A | 10/1993 | Israelsen | |
| 5,751,282 A * | 5/1998 | Girard et al. | 715/721 |
| 5,805,155 A | 9/1998 | Allibhoy et al. | |
| 5,850,218 A | 12/1998 | LaJoie et al. | |
| 5,930,526 A | 7/1999 | Iverson | |
| 5,956,716 A * | 9/1999 | Kenner et al. | 707/10 |
| 6,031,572 A | 2/2000 | Christopoulos | |
| 6,049,333 A | 4/2000 | LaJoie et al. | |
| 6,145,084 A * | 11/2000 | Zuili et al. | 726/3 |
| 6,175,831 B1 | 1/2001 | Weinreich et al. | |
| 6,314,452 B1 | 11/2001 | Dekel et al. | |
| 6,340,987 B1 | 1/2002 | Hayashi | |
| 6,351,596 B1 | 2/2002 | Ostrover | |
| 6,369,840 B1 | 4/2002 | Barnett et al. | |
| 6,374,290 B1 | 4/2002 | Scharber et al. | |
| 6,389,372 B1 | 5/2002 | Glance et al. | |
| 6,493,876 B1 | 12/2002 | DeFreese et al. | |

(Continued)

FOREIGN PATENT DOCUMENTS

WO    WO 0065838 A2    11/2000

(Continued)

OTHER PUBLICATIONS

"TV's Future May Be Web Search Engines That Hunt for Video", The Wall Street Journal, Dec. 16, 2004.

Primary Examiner—Brian T Pendleton
Assistant Examiner—Jonathan Lewis
(74) Attorney, Agent, or Firm—Gottlieb, Rackman & Reisman, P.C.

(57) ABSTRACT

Digital technology based consumer media devices have many desirable features, including the ability to easily find and watch television shows, and/or automatically record programs of interest. Disclosed is a system and method for allowing a group of television viewers to share program viewing information. This information, exchanged through various on-line community modalities (including Internet chat rooms, email, Internet Web Logs, and the like), can be used within a consumer media device, such as a Digital video Recorder to influence the decision process concerning which programs to record, buffer or view.

21 Claims, 7 Drawing Sheets

U.S. PATENT DOCUMENTS

| | | | |
|---|---|---|---|
| 6,536,043 | B1 | 3/2003 | Guedalia |
| 6,727,914 | B1 * | 4/2004 | Gutta ........................... 715/719 |
| 6,754,904 | B1 * | 6/2004 | Cooper et al. ................. 725/32 |
| 6,799,221 | B1 * | 9/2004 | Kenner et al. ................ 709/245 |
| 7,120,619 | B2 * | 10/2006 | Drucker et al. ................ 706/45 |
| 7,526,464 | B2 * | 4/2009 | Flinn et al. .................... 706/52 |
| 7,571,452 | B2 * | 8/2009 | Gutta ........................... 725/46 |
| 7,801,896 | B2 * | 9/2010 | Szabo ......................... 707/739 |
| 2002/0053084 | A1 | 5/2002 | Escobar et al. |
| 2002/0056088 | A1 | 5/2002 | Silva et al. |
| 2002/0087978 | A1 | 7/2002 | Nicholson et al. |
| 2002/0120925 | A1 * | 8/2002 | Logan ........................... 725/9 |
| 2002/0123928 | A1 | 9/2002 | Eldering et al. |
| 2002/0124247 | A1 | 9/2002 | Houghton |
| 2002/0129368 | A1 * | 9/2002 | Schlack et al. ................ 725/46 |
| 2002/0144262 | A1 | 10/2002 | Plotnick et al. |
| 2002/0144273 | A1 * | 10/2002 | Reto ........................... 725/86 |
| 2002/0154892 | A1 * | 10/2002 | Hoshen et al. ................ 386/87 |
| 2002/0162109 | A1 * | 10/2002 | Shteyn ......................... 725/87 |
| 2002/0174428 | A1 * | 11/2002 | Agnihotri et al. ............. 725/46 |
| 2002/0184634 | A1 * | 12/2002 | Cooper ........................ 725/51 |
| 2003/0005448 | A1 * | 1/2003 | Axelsson et al. .............. 725/58 |
| 2003/0014407 | A1 | 1/2003 | Blatter et al. |
| 2003/0026593 | A1 | 2/2003 | Ostrover |
| 2003/0050977 | A1 | 3/2003 | Puthenkulam et al. |
| 2003/0101450 | A1 * | 5/2003 | Davidsson et al. ............. 725/32 |
| 2003/0145331 | A1 | 7/2003 | Escobar et al. |
| 2003/0149975 | A1 | 8/2003 | Eldering et al. |
| 2003/0182567 | A1 | 9/2003 | Barton et al. |
| 2003/0208763 | A1 | 11/2003 | McElhatten et al. |
| 2004/0003118 | A1 | 1/2004 | Brown et al. |
| 2004/0010807 | A1 | 1/2004 | Urdang et al. |
| 2004/0015999 | A1 | 1/2004 | Carlucci et al. |
| 2004/0040035 | A1 | 2/2004 | Carlucci et al. |
| 2004/0148275 | A1 * | 7/2004 | Achlioptas ..................... 707/3 |
| 2004/0172415 | A1 * | 9/2004 | Messina et al. ........... 707/104.1 |
| 2004/0215793 | A1 * | 10/2004 | Ryan et al. ................... 709/229 |
| 2004/0221308 | A1 | 11/2004 | Cuttner et al. |
| 2004/0231003 | A1 * | 11/2004 | Cooper et al. ................ 725/135 |
| 2005/0028208 | A1 * | 2/2005 | Ellis et al. ..................... 725/58 |
| 2006/0015904 | A1 * | 1/2006 | Marcus ......................... 725/46 |
| 2006/0085818 | A1 * | 4/2006 | Bodlaender et al. ........... 725/46 |
| 2008/0319922 | A1 * | 12/2008 | Lawrence et al. ......... 705/36 R |

FOREIGN PATENT DOCUMENTS

| | | |
|---|---|---|
| WO | WO 0110115 | 2/2001 |
| WO | WO 0110115 A1 | 2/2001 |
| WO | WO 0110118 | 2/2001 |
| WO | WO 0110118 A1 | 2/2001 |
| WO | WO 01/10118 A1 | 8/2001 |
| WO | WO 0161997 | 8/2001 |
| WO | WO 0177954 | 10/2001 |
| WO | WO 0177954 A2 | 10/2001 |
| WO | WO 0178401 | 10/2001 |
| WO | WO 0178401 A2 | 10/2001 |
| WO | WO 01/50742 A1 | 12/2001 |
| WO | WO 01/50753 A1 | 12/2001 |
| WO | WO 0235840 | 5/2002 |
| WO | WO 0237853 | 5/2002 |
| WO | WO 2004/004186 A2 | 1/2004 |

\* cited by examiner

History 101

Back to Main Page

Class Discussions: We will be discussing the history of pyramids
From: Moderator
To: 2nd period class

510

In Friday's class, we will be discussing Carlson's theory on pyramid building. The History channel will be airing this <March 02, 2003 - 8:00-10:00PM EST - THC - Pyramid Building>. I recommend that everyone watch this program. It will provide a solid background to the information on which Carlson is basing his theories.

Options       Reply

*FIG. 5A*

510A 〰 <March 02, 2003 - 8:00-10:00PM EST - THC - Pyramid Building>

510B 〰 TV://THC/Pyramid Building/03022003/2000

510C 〰 <41097693>

510D 〰 <XML programLinkTag=ProgramUniversalID.initialAirtime@serverResolver.com/>

510D2 〰 <XML programLinkTag=ProgramUniversalID.initialAirtime;
ProgramUniversialID2.initialAirtime2@serverResolver.com/>

510D3 〰 <XML programLinkTag=MultiProgramUniversalID@serverResolver.com/>

510E 〰 TV://ProgramUniversalID.airtime.location@serverResolver.com

510F 〰 DOI Provider.Selector@10.1111_creatorCode/xyz_programCode

510G 〰 1234567890.10.2004-01-01.11:30.www.provider.com/path

*FIG. 5B*

510D 〰 <XML programLinkTag=ProgramUniversalID.initialAirtime@serverResolver.com/>
                         Channel ID    Time        Guide Data

600

Katherine's Blog
Category: Television

Wednesday, May 21, 2003

~~Did anyone catch the finale~~ of 24 <May 20, 2003 - 24><Rating 9> last night? WOW! My
~~husband and I have been w~~atching all year and were crazed to see the ending! What did
you think of the ending? I don't want to give it away yet, so that I don't spoil it for all of
605 ↙ you who haven't yet seen it - the rerun is on next Monday <May 26, 2003 - 24>.

Saturday, May 10, 2003

610    610

I turned on the TV the other night, and just caught the tail end of 24 <May 13, 2003 -
605 ↙ 24>. This was the next to last episode. Apparently, this is going to be quite a finale. The
final episode is on next Tuesday <May 20, 2003 - 24>. I hope you can all watch it and
then we can discuss.

610    620

Wednesday, April 30, 2003

605 ↙ I voted this week on American Idol <April 30, 2003 - American Idol><Rating 7>! Woo-
Hoo!! I've been thinking a lot about American Idol. I think this show is fabulous! Is there
anyone else out there who thinks this is the greatest? By the way, I voted for Kimberly.
I don't see why people hate American Idol so much. I mean, I sort of understand if they
hate reality shows and are taking out their rage on this one. It's just giving some unknown
kids a chance to be on television, and a couple of them a chance to make it big. I think
that's pretty cool.

FIG. 6

SYSTEM AND METHOD FOR RECOMMENDING PROGRAMMING TO TELEVISION VIEWING COMMUNITIES

RELATED APPLICATIONS

This application is a continuation-in-part application of prior application Ser. No. 10/746,809 filed Dec. 24, 2003, to which priority under 35 U.S.C. §120 is claimed. This application is related to the United States Patent Application, filed Nov. 16, 2004 entitled METHOD AND APPARATUS FOR EXCHANGING PREFERENCES FOR REPLAYING A PROGRAM ON A PERSONAL VIDEO RECORDER, filed on behalf of David Bryan, and Gilles Boccon-Gibod, herein incorporated by reference.

FIELD OF THE INVENTION

The invention concerns a system and method to allow groups of television viewers (users) to form communities. The communities provide new sources of viewing recommendations and programming information for users who are members of the community.

BACKGROUND OF THE INVENTION

Television distribution systems such as cable networks and satellites provide users with increasing numbers of television programs from which they can choose for viewing or recording. The advent of the Internet, and eventual use of the Internet to supply television-like programming, will further increase the amount of programming from which the user can choose.

The vast amount of programming available to users is both a blessing and a curse: it is a blessing to those whose interests and hobbies lend themselves to the many special interest programs and channels that are available, but a curse to those who have limited time to find and watch specific programs or entertainment that they may find useful and/or appealing. In many instances, these are the same individuals.

Because of their flexibility, advanced capabilities, and ease-of-use, digital technology based consumer media devices such as set-top boxes for cable and satellite television, DVD Recorders, Personal Computers (PCs) with television receiving and recording functionality, Personal Digital Assistants (PDAs) with video playback abilities, Personal/Portable/Digital Video Player/Recorders (PVPs, DVPs, PVRs, DVRs) all of which (hereinafter, collectively, DVRs), have begun to provide an alternative to the traditional television and Video Cassette Recorder (VCR) as means for viewing and recording television programs in the home. These devices provide the ability to view and record programs of interest, both through user commands and programming as well as by "learning" user likes and dislikes (preferences).

In spite of their powerful features, these devices still have limitations in their ability to assist users in the selection of programs to view and record. Users can select programs based on title, channel, time of airing, as well as by favorite actor, actress, director, or through the use of other specific parameters. This can be extremely time consuming, requiring extensive effort on the part of the user.

As a result of the limitations of current digital consumer devices, users can frequently find that they have missed programming of interest to them. As an example, users can find themselves in chat rooms or involved in discussions on the Internet regarding a program that they have not seen or recorded.

For the foregoing reasons, there is a need for a method and system to share user viewing experiences including new viewing opportunities and program recording suggestions.

SUMMARY OF THE INVENTION

The present system and method enhances the overall television user experience by facilitating the sharing of viewing experiences and suggestions regarding program viewing and recording. The sharing of experiences includes sharing of electronic lists created by other users as well as the use of recommendation lists published by user groups or critics. The lists contain at least one reference to a program or channel viewed on another television. In one embodiment, these lists (generated by individual users, critics, or formed through group interaction) appear in on-line magazines and newspapers. A user's television, DVR, set-top box, PC or other device accesses these lists through a network (e.g., the Internet) and, based upon recommendations (references) on the lists, selectively causes tuning to recommended programming. Recording of the recommended programming can also occur on an automated basis. In an alternate embodiment, e-mail is used to communicate the lists. In another embodiment, Internet Web-Logs (blogs) provide the references to the user's device, either through manual selection by the user, through automated retrieval by the device, or by automated transmission by a server hosting the blog. Other forms of electronic communication may also be used to share program recommendations.

An alternate embodiment of the system and method includes the use of a centralized server to learn about group preferences and to access blogs, e-mail, or other web sites containing recommendation lists. In this embodiment, the central server compiles recommendations and, based on the user's previously determined preferences, transmits recording preferences to the user's device. In this embodiment, monitoring of recommendation lists is performed by the centralized server rather than through the individual users' equipment. The centralized server may also receive e-mails with recommendations, and uses this information to provide viewing or recording references to the individual users' devices.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 5 illustrates a possible web log (blog) that may be used to control a DVR;

FIG. 6 illustrates a chat room page that may be used to control a CMD; and

DETAILED DESCRIPTION OF PREFERRED EMBODIMENTS OF THE INVENTION

Figure 1:
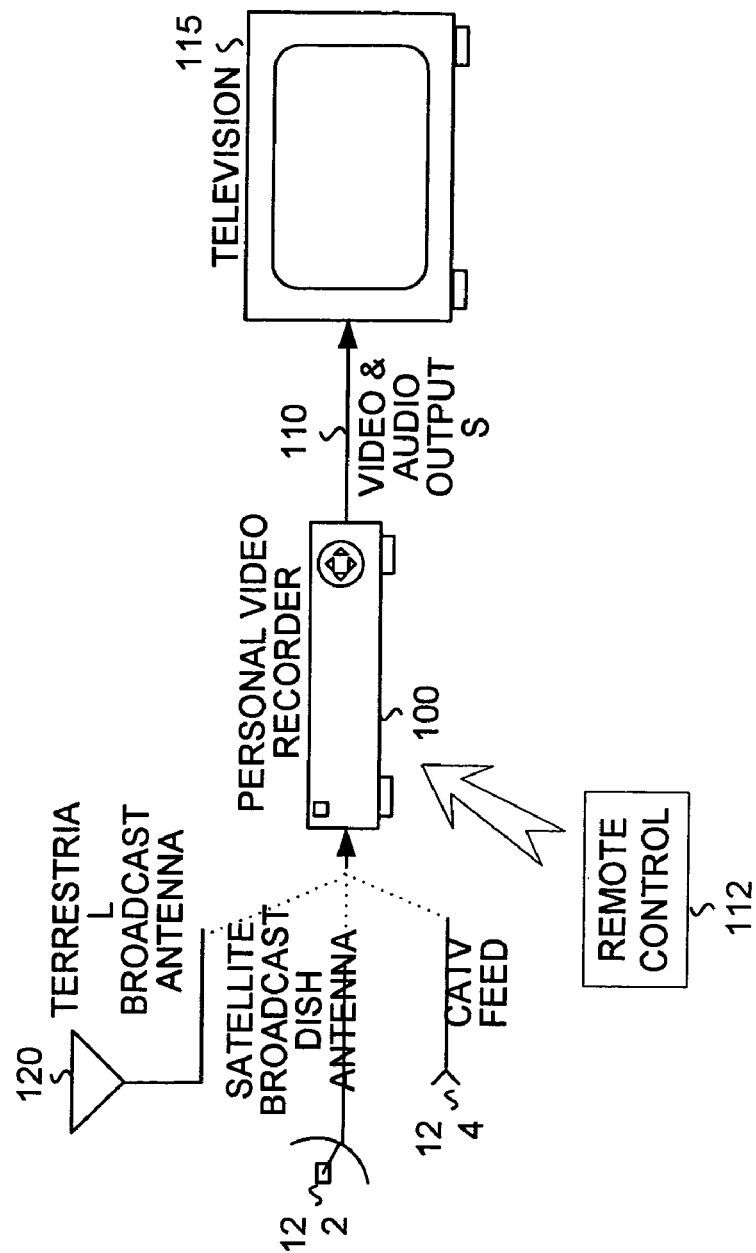
FIG. 1 illustrates a Consumer Media Device (CMD) installation.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

In the below embodiments, we describe methods and systems that are realizable using digital technology based consumer media devices (CMDs). For clarity in describing the invention with reference to well known devices, and because certain embodiments include recording capability, we often refer to a digital video recorder or a "DVR" as an exemplary CMD. However, the ideas described herein should not be construed as limited to embodiments that require recording capability (or "DVR capability"). Any media viewing and/or recording device or set-top box with digitally-controllable tuning capability can be used to realize the functionality implied by many of the concepts described herein. Examples of such devices include: Archos Pocket Video Recorder AV 420 and Gmini400, Creative Zen Portable Media Center, ReplayTV, Scientific-Atlanta Explorer 8000, TiVo, and/or the like.

FIG. 1 shows a DVR installation scenario. Digital video recorder 100 receives a broadcast signal from one or more sources of programming. The sources of programming may include terrestrial broadcast, satellite broadcast, and cable television (CATV). These sources of programming are received respectively by a terrestrial broadcast antenna 120, a satellite broadcast dish antenna 122, and a CATV feed 124. A source of programming comprises analog, digital or a combination of analog and digital programs. The video and audio outputs 110 of the digital video recorder 100 are connected to the television 115 for user viewing of programs from digital video recorder 100. The video and audio outputs 110 may also be connected to a recording device such as a Video Cassette Recorder (VCR) or DVD recorder. Digital video recorder 100 also contains a telephone modem (not shown) that enables digital video recorder 100 to download program guide information and to allow the user to order programs through digital video recorder 100 using remote control 112. Generally, a telephone call is placed periodically to allow digital video recorder 100 to update program guide information. This enables digital video recorder 100 to automatically correct for changes in the programming scheduling. The telephone modem is also provided to allow the user to update the programming of the digital video recorder 100 directly from remote control 112. The user can also use remote control 112 and the program guide to select a "pay-per-view" program. "Pay-per-view" refers to a program that has a specific fee associated with viewing the program, including movies, concerts and sporting events. The telephone modem also allows the user to change his or her received programming. For example, a user might decide that he or she would like to receive Showtime Network, which is a network that viewers must pay to subscribe to. The user can select Showtime Network from the program guide and order the network, causing the information to be uploaded to the service provider from digital video recorder 100 by using the modem. The service provider then provides the specified channel(s) or program, updates the user's monthly bill, and bills the user for the new channel(s) or programs.

A DVR can be set to record a particular program by one of four general methods. The first method resembles programming of a VCR. This method includes a user selecting a desired channel, date and time for recording. The DVR will simply record the selected channel at the selected time.

The second method of recording is performed by selecting a program through an on-screen menu. DVRs have a program guide that shows channels available for viewing and the programming that will be aired on the channels at a particular time. A user viewing the program guide may simply select a specific program that will air on a channel and press the record button (either on remote control 112 or digital video recorder 100). This guide contains programming information that is used to set the recording of digital video recorder 100. The programming information includes the date/time and the channel selected. This second method may also include selecting a program by the program title. DVRs enable the user to look up programs by designating a title name. Digital video recorder 100 will then display (on television 115) all upcoming episodes of programs having the designated title. The user can then elect to record a specific episode by selecting the episode and pressing the "record" button.

The third method includes scheduling an indicated program to automatically record throughout a season (or year). This may be called "a season pass". A user indicates a desired program and indicates that he or she desires to record every episode. This selection is performed either through use of the programming guide or by designating a title, as previously described. This selection allows a user to record all upcoming episodes or only "new" episodes (i.e., does not include previously shown episodes that are repeated). Digital video recorder 100 will review the daily downloaded program information and will record the selected program. For example, a user may enjoy a particular series, such as "Everybody Loves Raymond". The user could select "Everybody Loves Raymond" from the programming grid, and elect to record all new episodes. Digital video recorder 100 would automatically review the programming grid during the daily download, and record any new episodes of "Everybody Loves Raymond" that are aired.

The fourth method allows the DVR to select programs based upon a user's stored history. For example, if a user records several "police dramas", this indicates that the user enjoys "police dramas" (i.e., dramas that deal with the investigation of crimes). Digital video recorder 100 will automatically record new programs that deal with investigating crimes.

Other techniques for selecting programs for recording also include recording shows starring a particular actor or actress, or directed by a particular director.

In addition to recording entire programs, DVRs may "buffer" channels or portions of programs as described in co-pending application "PERSONAL VIDEO RECORD- ERS WITH AUTOMATED BUFFERING", incorporated herein by reference. This buffering process would typically anticipate which program a user will want to watch, and begin storing the program from its beginning, thereby allowing a user to watch a program in its entirety, despite the fact that they turn on the television some time after the start of the program.

Figure 2:
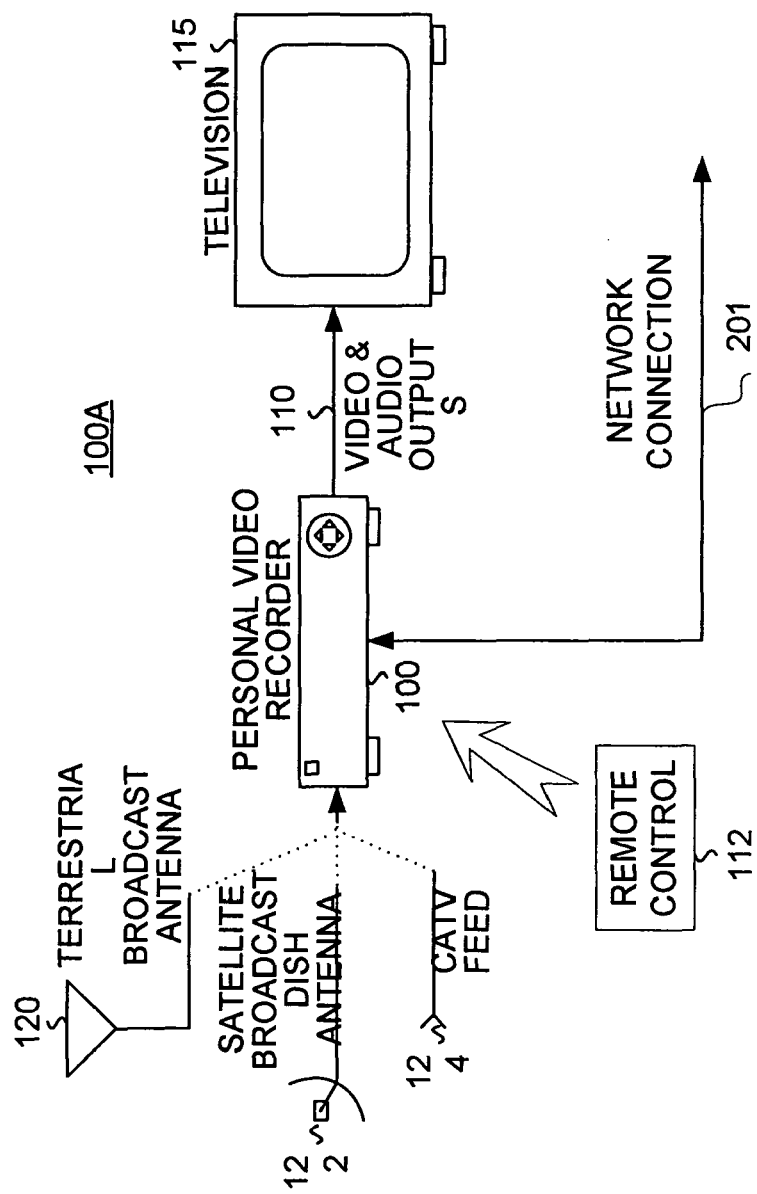
FIG. 2 illustrates a CMD that is directly connected to the Internet.
Figure 3:
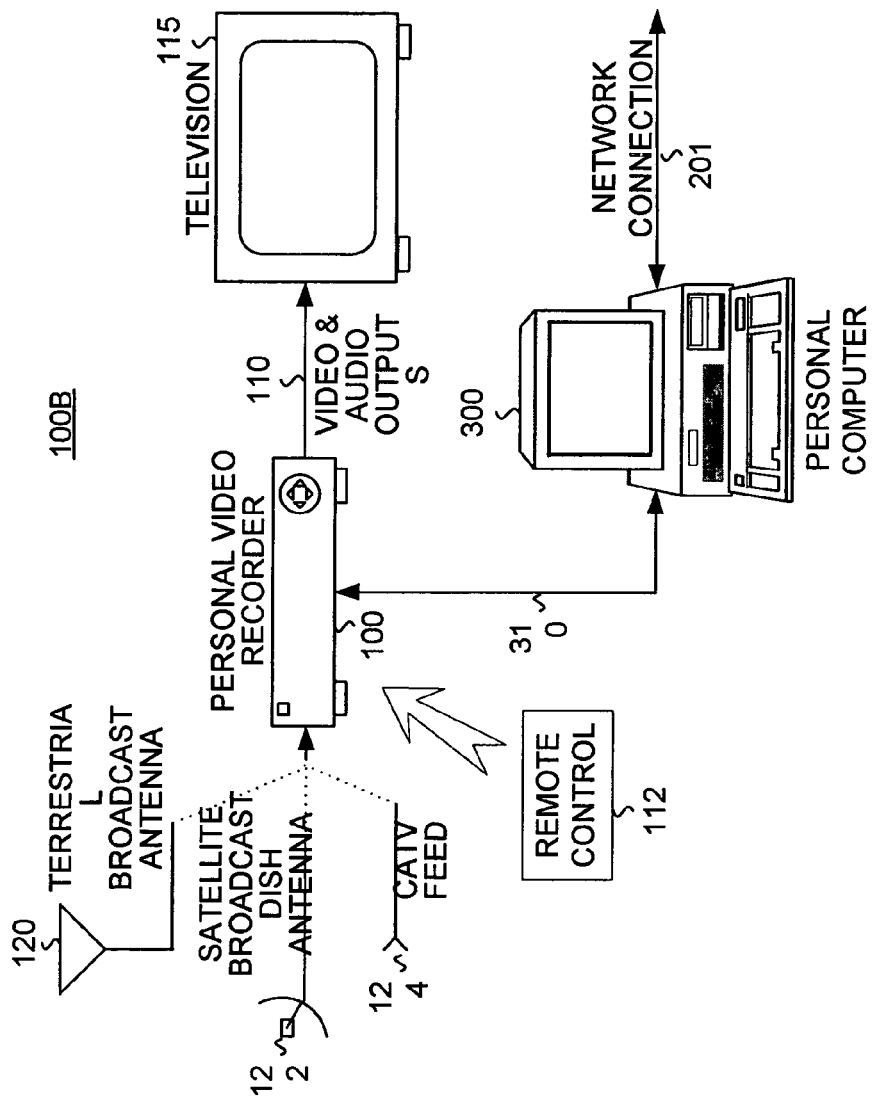
FIG. 3 illustrates a CMD that is connected to the Internet through a secondary device.

Digital video recorder 100A can be connected directly to the Internet through network connection 201, as illustrated in FIG. 2, or digital video recorder 100A can be connected to a personal computer 300, which in turn is connected to the Internet through a network connection 201, as illustrated in FIG. 3. Network connection 201 can be of any known form, including cable modem, wireless modem, Digital User Line (DSL), standard telephone line or a satellite. As will be appreciated by one skilled in the art, other methods of connecting to the Internet or can be used, such as wireless connections utilizing a notebook computer, Personal Digital Assistant (PDA), or a cellular phone.

Figure 4:
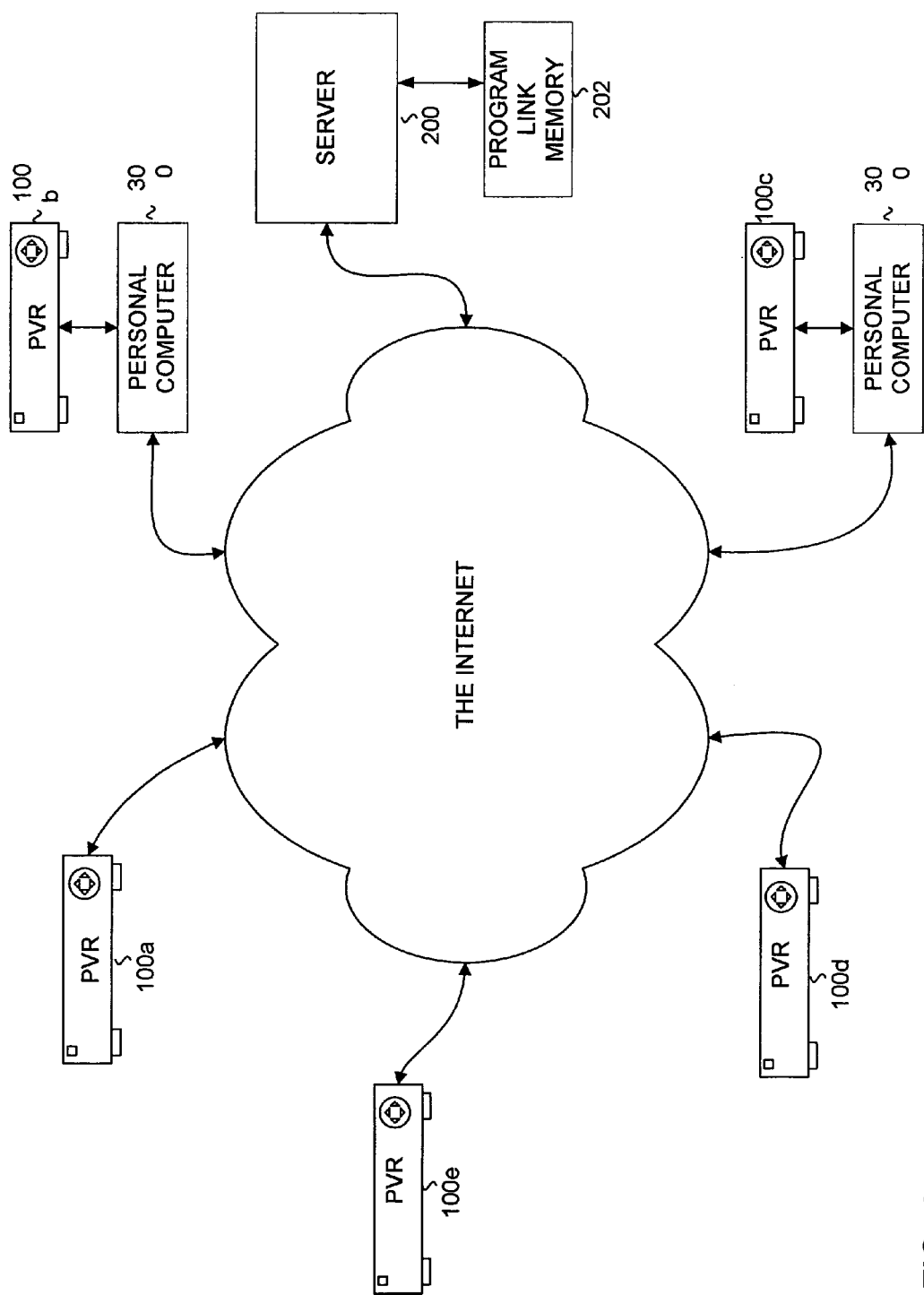
FIG. 4 illustrates a community consisting of a group of CMD users.

One example of a television viewing community, illustrated in FIG. 4, includes a group of DVR users connected to the Internet who share experiences, provide various levels of technical and moral support to one another, and suggest/recommend programs to watch and record. Digital video recorders 100a-e can be directly connected to the Internet or connected to the Internet via a personal computer 300 through network connection 201. Members of the DVR community can "meet" and share information through modalities: chat rooms/instant messaging, email, and web logs (commonly called "blogs"). Information exchanged through various community modalities can be used within the respective digital video recorders to influence the decision process concerning which programs to record, buffer or view.

The following are scenarios that describe exemplary modes of sharing that can be used to enhance the television viewing and/or recording experience.

Chat Rooms/Instant Messaging/Email

In one embodiment, a CMD user joins a chat room that is either public or private and has one or more other CMD users. The chat "client" (software used by each user participating in the chat room) may run directly on a CMD that is directly connected to the Internet as illustrated in FIG. 2 (using the television screen as the text display), or may run on a personal computer attached to a CMD as illustrated in FIG. 3.

FIG. 5A is an illustration of an exemplary page for a chat room as described above. Discussions in a chat room like that represented in FIG. 5A may involve any topic of interest to the participants, including school topics, current events and general technology, or may focus on television and CMD-specific topics such as how to best use CMD features, technical and social issues related to CMDs, and programs of interest. A user can insert a program link 510 to a program that he or she found to be particularly appealing and which other users may select. Program link 510 is a text field that contains information sufficient to allow a CMD to find the program referred to by the program link and either tune to the program (if it happens to be running at the time the link is retrieved), or set the CMD (in this case assumed to include DVR functionality) to buffer the program, or record the program if the program is scheduled in the future.

Program link 510, in one embodiment, is generated manually by the user. In this embodiment, the user looks up the program information in a program listing or program guide and manually transcribes the appropriate information to a text entry field in the chat room screen. In an alternate embodiment, the user inserts a program link by selecting a field or block (with a mouse or other pointing device) in an Electronic Program Guide (EPG). In this embodiment, the system automatically transfers the necessary information from the EPG to the appropriate text entry field in the chat room. These embodiments are readily adapted to alternate community modalities, like instant messaging and email.

In the embodiment illustrated in FIG. 2, program link selection may be made on the television screen through remote control 112. In the embodiment illustrated in FIG. 3, the selection of program link 510 is made by using the computer's pointing device (mouse, or the like—not shown) on the displayed program link. In this embodiment, personal computer 300 sends a message through communications path 310 to digital video recorder 100. This message provides the program information to the DVR.

Program link 510 in FIG. 5 differs from the traditional hyperlink used in Web browsers, in that program link 510 is specifically designed to be used by, e.g., a digital video recorder 100A (either directly or indirectly, as described above) to identify a television program. Program link 510 may contain the same program information that is provided in the DVR electronic program guide, as discussed above. Creating the program links with the same information that is provided in the program guide simplifies the implementation of digital video recorder 100A. The selection of program link 510 by the DVR user sets up digital video recorder 100A to record, buffer, or play the selected program (depending on the time the program is to be presented and the time at which the program link is selected). This selection functions similarly to selecting a program from the program guide because the program link contains similar information to that provided in the program guide, and preferably uses the same format.

FIG. 5B illustrates several alternative formats for program link 510. Program link format 510A shows the complete description, as it would be stored in an Electronic Program Guide, including the presentation date and time, the network (THC, in the example), and the program title. Program link format 510B illustrates an alternative format that may be used as a URL (Universal Resource Locator) used to identify a location on the Internet. Program link format 510C uses a numeric code that uniquely determines the program, network, date and time. This code would be based on, for example, the Gemstar VCR+ codes published by most major newspapers and used to program VCRs. In one embodiment, an XML and/or HTML tag may be employed to establish a link 510D. The tag may employ a universal, unique program identifier, which is a unique number assigned to every program, which is represented as "ProgramUniversalID 510D. The tag may also include the airtime and location and employ a server revolver at location serverResolver.com in cases where the content is to be directly accessed 510E. In one embodiment, such an identifier may be supplied as a digital object identifier (DOI). In another embodiment, a DOI may be used. The DOI, e.g., "10.111_creatorCode/xyz_programCode" provides a unique identifier for the program and can provide information about the creator/owner of the program. Also, the DOI may provide a provider selector prefix to the DOI "Provider.Selector" to select amongst a number of providers through a DOI multi-link 510F. This might allow for numerous providers to offer to sell or supply the program through the DOI multi-link which can access multiple metadata providers. In another embodiment, a link may comprise a unique program identifier (e.g., a DOI) such as "1234567990" a network "10" signifying a channel or other source provider, a date "2004-01-01", a time "11:30", and, optionally, a provider location "www.provider.com/path" 510G. The program link formats presented in FIG. 5B are only examples, and those skilled in the art will recognize that many alternative formats may be used. In one embodiment, a link translator is employed. The link translator will identify field elements making up a link by parsing a database of known link formats. Then the program link translator will re-map the field elements into a target format. Such a program link translator is useful for translating program link formats as between DVRs, browsers, and/or the like.

In one embodiment, a link translator is employed. The link translator parses each of any of a multitude of link formats into its constituent field elements and translates and/or otherwise generates a new resulting link in another link format. Thus, for example, link format 510D may be translated to a DVR that only can interpret link format 510E. A translator component maintains a list of various DVRs and the link formats they are capable of interpreting.

Upon providing a link for supply to a user, the system may determine the user's DVR type. In one embodiment, this may be achieved by achieved by looking up the user's identifying indicator (e.g., email address, buddy list identifier, DVR user account name, etc.) and looking up the DVR they have on account. In another embodiment, the system checks the target address with an inquiry regarding the device type at the target. By providing the device model type, the system may them determine an associated program link type employed by the responding device type. Upon establishing the target device type, the program link translator may then decompose a link into its constituent field elements and reassemble those parts into the program link type of the target device. For example, in a situation when a user receives a 510D formatted program link at his DVR and activates that link, his DVR may not understand that link format. A program link translator may be engaged, either right on the DVR, or accessed from a communications network at a server engaging in program link translations. In such an instance, the program link translator parses the 510D's ProgramUniversalID field and converts it into a program ID "1234567890" and a channel number "10." This may be achieved by performing a lookup on the ProgramUniversalID to resolve to a program identifier and channel number. Next, the link translator parses 510D's initialAirtime field and converts that to the 510G date format of "2004-01-01-11:30." Similarly, the program link translator would convert the location of guide data from 510D "serverResolver.com" to the 510G format of "www.provider.com/path." The program link translator would look up the guide data based on the target DVR's guide provider. All these constituent fields from the 510D program link are reassembled into the 510G program link format and then the user's DVR may employ this link to obtain guide data, channel, time and program identifying data to schedule a recording of the program.

In an alternate embodiment, program links simply indicate the network, program title, and episode. When this program link is received by server 200 or digital video recorder 100, program guide data is searched to locate all broadcasts, rebroadcasts and reruns of the program indicated by the program link. These alternatives are provided to the program selection decision process to aid in selecting appropriate times for recording the selected program.

In another embodiment, the channel of digital video recorder 100A may be set based on chat room discussions. For example, the chat room screen may include an indication of a particular channel that is currently showing a program that is the subject of a current discussion. This indication includes a program link 510 that includes information such as the program title, time and channel. In this embodiment, this information is used by digital video recorder 100A to select a channel or program to view. A user is able to set his/her chat preferences to always tune to the channel being discussed in a chat room in which the user is participating. When a user logs onto a chat room that is set to program the user's digital video recorder 100A, the chat room sends the program information either directly to digital video recorder 100A (in the system illustrated in FIG. 2) or through a personal computer as illustrated in FIG. 3. In an alternate embodiment, digital video recorder 100A includes multiple tuners. In this embodiment, the channel being discussed may be recorded while the user continues to watch, or the DVR continues to record, a different channel. Additionally, a user can set digital video recorder 100A to automatically record both the program that is currently being discussed and the future episodes of the same program series.

Referring again to FIG. 4, when a DVR user, such as the user associated with DVR 100a joins a chat room, the user sets his or her preferences, which may include the user's Internet address and DVR information. The DVR information includes the type of DVR (necessary to program the DVR), the programming service that is used to provide television programs to the DVR, and information as to how to access the DVR. Access information includes how the DVR is connected to the network (through a telephone modem, a wireless modem, through a computer or through a Local Area Network). This information is part of the registration form required for membership in the chat room. When a user logs onto the chat room, the chat room server 200 can verify the user's identification and DVR information. During chat sessions, when a user posts a program link, the server stores the links in program link memory. This program link is then downloaded either automatically, or on request by the other users to their respective DVRs to enable the other users to record, buffer, or watch the program indicated by the program link. For example, a group interested in archeology may be planning on discussing theories of ancient pyramid building. The chat room moderator determines that a program of interest is going to be aired later in the week (e.g., Wednesday night). The chat room moderator logs onto the chat room prior to the air time of the program (e.g., Sunday), posts a program link that includes the program information, posts a discussion time (e.g., Thursday night) and sends an e-mail to all of the chat room members instructing them to log onto the chat room before the air time (e.g., Wednesday). Upon receiving the e-mail, a number of chat room members log onto the chat room and click on program link 510. The host web site automatically downloads the program information to each of the chat room members' digital video recorders, using their stored parameters. The chat room members' digital video recorders 100 receive the program information and use the program information to select recording of the desired program. The members are then able to view the desired program prior to the discussion time, making the discussion more interesting and informative.

In one embodiment, a custom multi-program link may be employed. For example, a teacher may determine that 4 shows regarding pyramid building in concert will suffice to provide a total history on the topic for students. The teacher may generate a multi-program link that refers to each of the four shows. In one embodiment of a multi-program link, a program identifier and airtime for each program are listed one after another (i.e., ProgramUniversalID, ProgramUniversalID2, and initialAirtime and initialAirtime2) 510D2. In another embodiment, a guide entry is made providing a new unique multiprogram identifier that targets individual program times 510D3. In either of such embodiments, a scheduling resolver for the programs (i.e., serverResolver) may store information regarding the combined and/or constituent programs in the multi-program link. The reason for the scheduling resolver is to obtain the latest program guide information for a user's service provider. For example, a user A may generate a program link for show A on Jan. 1, 2005, but user B does not get around to activating the program link until Jan. 1, 2006. The user's DVR checks the current date and notices it is stale. In one embodiment, the DVR may then check its guide information to see if that program is available on any of the channels at any time based on identifying information in the link. If no reference is found in the guide and/or the link is stale, then the scheduling resolver may lookup the program based on its identifier and/or time and provide the most current air times available for user B. This can be done by forwarding the reference link to a scheduling resolver (which may be a server with expanded guide data) and the scheduling resolver will in turn send back updated program availability. This may be further facilitated by having the DVR send its DVR type and the users content provider name (e.g., the user's local cable company identifier) so that the scheduling resolver's response will provide accurate availability for the program. In one embodiment, the scheduling resolver simply sends back a time to record, channel to record, and duration to record as a response. In another embodiment, the scheduling resolver sends back a reference used by the DVR to lookup the program in its own internal program guide database. This is of particular importance when user A has cable company A and user B has cable company B, and the programs in the link will be found to air at different times and channels on the different cable companies. As such, the server resolver can maintain the "freshness" of the links over time.

Another example of a chat room group is a group of people interested in European travel. Members can log onto the chat room to find out information about traveling in Europe, or specific European countries. One member may start discussing a particular program detailing travel to various wine regions of Western Europe. This member may insert a program link 510 to the particular program into the message being posted. Other members of the chat room can select the program link, and after downloading have their DVRs automatically record the program. Then, at a later date, all of the members can "meet" to discuss the program. This can enable a more enlivened and interesting discussion, based on the viewing of the program.

In another embodiment, the chat room has a discussion leader or moderator, who has limited or total control over what all of the other members of the chat room are viewing, recording and/or buffering. The discussion leader sets future programming parameters (date/time/channel) in order to ensure that participants in a future chat have the desired programs available. After the programming is set by the discussion leader, the chat room sends the program links (in one of the manners previously described) to all of the chat room members' DVRs. DVRs, receive the program link and select a recording date, time and channel according the information provided in the program link.

As an example of this feature, CMD users can form a chat room about home improvement. In this chat room, members can discuss ideas on home improvement projects and give suggestions on how to perform various projects, including an ongoing discussion on home additions. The chat room moderator can post a program link containing program information for a specific series of programs on how to build a foundation, floor and walls for an addition to a house. When a member of the chat room logs onto the chat room to review the discussion, the program link automatically sets his or her digital video recorder 100A to record the upcoming episodes, or display and/or record the episode currently being received.

This programming is performed in the manner previously discussed and differs from the previous example only in that the members of the chat room do not have to click on program link 510 to enable programming of their DVRs. The automatic recording of the suggested episodes enables the chat room members to discuss the ideas and suggestions shown in the particular viewed episode.

A program link can be communicated to a PVR by a variety of other methods and mechanisms.

In one embodiment, the users DVR runs a web server and is attached to their home network, which is accessible over a communications network. In such an embodiment, the user engages the program link and their browser would contact the DVR. The DVR would be known to the user's computer by way of a preference setting (e.g., by providing an IP address for the DVR) and therefore the user would not have to re-enter the DVR address every time they engage a program link. In another embodiment, the DVR is provided with its own email address and is capable of reading emails. In such an embodiment, engaging a program link generates an email addressed to the users DVR and results in program scheduling.

In another embodiment, each DVR is allocated a network address (such as an IP address) which is long-lived or permanent. In such an implementation, the recipient DVR can be identified by its IP address and a server task can execute on the DVR to listen for and receive incoming programming links. As a variation, each DVR can be identified a symbolic identifier (such as a hierarchical domain name in the Domain Name System). The network address of a DVR can be resolved based on its symbolic name using a name service, which may take the form of a centralized server, a system of replicated servers, or as a more concrete example, a system of DNS servers.

If DVRs do not have long-lived network addresses, other means of communicating programming links are still possible. In one implementation, each DVR is identified by a symbolic identifier. A name service (which may be implemented in many ways, including, among others, centralized, replicated, distributed) is used to resolve the symbolic identifiers into network addresses. Each time the network address of a DVR changes, the DVR will report its new network address to the name service, thus keeping the latter up-to-date. Such a system will function like dynamic DNS or certain instant messaging (IM) systems.

In another embodiment, a server or a system of servers with sufficiently high availability can be used to receive programming links on behalf of DVRs. Each DVR will periodically connect to one or more such servers to retrieve programming links addressed to it. Such a system can function like an email system. In fact, an email system can be adapted for such purpose. In such an implementation, a DVR will function as a client to one or more email servers.

As an aspect of possible implementations, each DVR is associated with a unique or almost certainly unique identifier. A unique identifier may be derived from, for example, the MAC address of the Ethernet interface of the DVR, if Ethernet is used for networking purposes. Likewise, a unique identifier may be derived from unique identifiers that are allocated or generated for other purposes, such as the combination of model and serial numbers of the DVR itself. Almost certainly unique identifiers can be locally generated based on random locally available sources of randomness. So long as the identifier is long enough and a sufficient amount of entropy is sampled, the resulting identifier can be made practically unique. The analysis of the required amount of entropy and the probability of generating a non-unique identifier is well understood and requires only elementary skills in probability theory.

In an embodiment with a centralized server approach, clicking a programming link, e.g., on the web page of a chat room, may initiate contact with a server at a well-known address. That server may contact the machine of the user who initiated contact with the server to retrieve a cookie which contains a unique identifier of that user's DVR. Any of the above techniques may then be used to resolve the address of that user's DVR. It is also possible to route links to a user's DVR without the involvement of a centralized server, as described below.

As yet another way of routing a programming link to a DVR, DVRs can be arranged in a peer-to-peer (P2P) network, in which each DVR is in direct communication with a small number of other DVRs. The DVR with a given (almost) unique identifier can be located and contacted using broadcast-based searching in the prior art.

For example, the file-sharing programs have completely decentralized and distributed architectures, meaning that there are no central servers and that all computations and interactions happen between clients. All connections on the network are equal. When a client wishes to connect to the network they run through a list of nodes that are most likely to be up or take a list from a website and then connect to how ever many nodes they want. This produces a random unstructured network topology. Routing in the network is accomplished through broadcasting. When a search request arrives into a client that client searches itself for the file and broadcasts the request to all its other connections. Broadcasts are cut off by a time to live that specifies how many hops they may cover before clients should drop them rather than broadcast them. Searching on a decentralized network is accomplished by creating a keyword string that describes the file you want and broadcasting that string to all your connected neighbors. Your neighbors will then in turn broadcast that message to all their connected neighbors and so on until the packet's TTL has been reached.

Another architecture follows a 2-tier system in which the first tier consists of fast connections to the network (Cable/DSL and up) and the second tier consists of slower connections to the network (modem and slower). Clients on the first tier are known as SuperNodes and clients on the second tier are known as Nodes. Upon connection to the network what happens is that the client decides whether you are suitable to become a SuperNode or not. If you can become a SuperNode, you connect to other SuperNodes and start taking connections from ordinary Nodes. If you become a Node you find a SuperNode that will allow you to connect to them and connect. Routing on a 2-tier P2P network is accomplished by broadcasting between the SuperNodes. For example, when a Node issues a search request to the SuperNode it is connected to, the search request is taken by that SuperNode and then broadcast to all the SuperNodes with which it is communicating. The search continues in this way until its time-to-live (TTL) has reached zero. Every SuperNode that it reaches searches an index that contains all the files of its connected Nodes. Replies are routed back along the path that they came from until they reach the clients that originally issued them. A possible problem with this type of routing is that clients making up the backbone may connect and disconnect sporadically, which means that it may not always be possible to route packets back along the path that they came from.

In an embodiment based on P2P technology, clicking a programming link, e.g., on the web page of a chat room, may initiate contact with a node or supernode that may either already have knowledge of the address of a user's DVR, based upon the unique identifier of that DVR supplied to it, or else may use a broadcast approach to route that link to the user's DVR. In such an approach, clicking the link may initiate a request to the user to enter the unique identifier of his DVR, or may invoke a script that retrieves said unique identifier, said unique identifier having been previously saved on the machine form which the user has clicked the link.

In an embodiment with a centralized server, engaging a programming link, e.g., on the web page of a chat room, may initiate contact with a server at a well-known address. That server may contact the machine of the user who initiated contact with the server to retrieve a cookie which contains a unique identifier of that user's DVR, and perform a lookup of that DVR's address. That address can then be used to route the link to the user's DVR.

In another embodiment, DVRs can be arranged in a peer-to-peer (P2P) network. A user engaging a programming link, e.g., on the web page of a chat room, may initiate contact with node or supernode that may either already have knowledge of the address of a user's DVR, based upon the unique identifier of that DVR supplied to it, or else may use a broadcast approach to route that link to the user's DVR. Such a broadcast approach may include sending a message containing the link to all or some subset of network nodes. In the case where the broadcast is sent to a subset of network nodes, one or more of the nodes in that subset may forward the link-containing message to the DVR using a directory of addresses associated with unique identifiers. In a P2P embodiment, engaging the link may initiate a request to the user to enter the unique identifier of his DVR, or may invoke a script that retrieves said unique identifier, said unique identifier having been previously saved on the machine from which the user has engaged the link.

Yet another example of chat room directed recording is a cooking club chat room. A group of people who like a particular cooking show can join a chat room hosted by the cooking show. The producer of the cooking show may act as the chat room moderator. The producer edits the content of the chat room to include a page that contains a program link for a specific future episode of the show, and a list of ingredients necessary to cook along with the specific episode of the show. Members of the group are able to log onto the chat room and click on the program link 510, causing both the programming of their digital video recorder 100 to record the episode and causing printers (not shown) connected to the home network to print a shopping list of the ingredients needed to prepare the meal presented on the show. Alternatively, the shopping list may be sent to a Personal Digital Assistant (PDA), cellular phone or other mobile electronic device. The members are then able to purchase all of the ingredients necessary (if desired) and view the specific episode of the show at their leisure. If the user wants to cook along with the show, the user has the ability to pause or rewind the program in case the user is unable to keep up with the cooking process of the chef. Also, many cooking shows will show the preparation of an item that cooks for an extended period of time (e.g., hours). For example, the chef prepares a chicken to roast in the oven, gives roasting instructions and then removes a chicken from the oven that has already been roasted. Using a digital video recorder 100A would allow a cook to prepare a chicken, place the chicken in the oven, and turn off the cooking show while the chicken is roasting. When the chicken is fully cooked, the user then views the remainder of the cooking show in order to learn how to prepare the sauce for the chicken or how to carve the chicken.

Another embodiment has a chat room where a user just watches specific programs that are selected by another individual. For example, a history teacher may inform his or her students that a series of interesting programs are going to be broadcast, and that it would benefit all of the students of the class to view these particular programs. The history teacher then posts program link 510 onto a chat room that is dedicated to the history class, has limited membership to members of the history class, and is moderated by the history class teacher. Program link 510 is then posted either manually by the history teacher by inserting program link 510 or by use of the teacher's DVR. The history teacher can set his or her digital video recorder 100A to automatically insert program link 510 onto the history chat page every time the teacher selects the recording of a history program. The students can log onto the chat room and click on program link 510, resulting in the programming of their individual DVRs to record the history program being viewed by the teacher.

Alternatively, a CMD user could set his or her CMD to automatically post a program link to a web page, chat room or Blog, for every program that the user watches, buffers or records. Another user then logs onto this web page or chat room and views or records all of the programs that are posted on the page.

In another embodiment, the history teacher invites his or her students to join an on-line discussion (in a chat room, for example). The discussion includes viewing one or more programs or program segments during the discussion. In this scenario, the history teacher posts program links 510 to the chat room that immediately cause each student's CMD to tune to the appropriate channel. Program link 510 may be posted manually by the history teacher by inserting program link 510 into the chat transcript, or the history teacher can set his or her CMD to automatically insert program link 510 onto the history chat page every time the teacher tunes to a program of interest. In this scenario, the CMD needs only the capability to detect the program link and automatically tune to the correct channel. A program recording facility is not required.

In one embodiment, a security code is provided to prevent unauthorized users from sending links to unwanted programs. Additionally, a program rating code can be included. The security code enables a user to prevent other users from selecting programming of CMD without entering the security code. The program rating code can be provided to provide protection from programs having undesirable content, such as sexually explicit material, graphic violence or profanity. A parental setting can be provided that prevents recording, buffering or viewing of programs that contain unwanted content. Parents can set CMD to disable recording or viewing of any program that gets a rating higher than TV-13 without entering a password. This allows children use of the chat function because parents do not have to worry about the content of the programs that may be viewed by selection of program link 510. This parental control is similar in nature but not limited to, the functionality embodied in the "V-chip" currently installed in televisions.

Chat rooms can have ad hoc or continuing membership. In one embodiment, posting to the chat room is controlled by the chat room moderator. The chat room can be set so that only the moderator is able to post links. Conversely, the chat room can be set so that any member is able to post links. The chat room moderator has the capability to prevent barred members from posting to the site and to prevent programs of questionable subject matter from being posted.

A CMD such as a DVR 100A can also be equipped with e-mail functionality, or connected to a PC e-mail client 300. While viewing a program, or a preview for a specific episode of a program, a user can send an e-mail notice to one or more people on his or her mailing list announcing the airing of the specific episode of the program. The e-mail can be sent the same way traditional e-mail is presently sent, i.e., a POP 3 server, an IMAP server or any other known server. A user can either designate individuals for each e-mail or send an e-mail to a specific group, consisting of specific e-mail addresses for specific individuals. For example, a teacher can designate all of his or her students under the group "class" and the teacher can e-mail the entire class by selecting "class" or e-mail only individual students. On receipt of this email, the recipient's digital video recorder 100A parses the message and determines if the message contains a properly formatted program announcement. If a properly formatted program announcement is found, either digital video recorder 100A is programmed to record the specific program specified in the announcement, or the announcement influences the decision process for what gets recorded by digital video recorder 100. The decision process takes into account the entirety of specific programs that are currently parsed in digital video recorder 100A to be recorded.

In one embodiment, a user designates the "priority level" of specific senders based on the similarities of viewing habits between the user and the sender. For example, the user designates person A, who has a large number of interests similar to those of the user, with a high priority level and person B, who has fewer interests similar to those of the user, with a lower priority level. E-mails received from person A receive more weight than e-mails from user B. In the scenario where a user receives an e-mail from user A and an e-mail from user B, both indicating the recording of specific programs that occur at the same time, digital video recorder 100A will automatically record the program indicated in the e-mail sent by user A.

In one embodiment, the "priority level" of individual users is set automatically by another user's CMD. This level is set by comparing both the programs viewed and program recorded by various DVR users. Users who have a history of watching or recording similar programs are assigned high priority levels. Users who have more dissimilar viewing and recording histories are assigned lower priority levels. The priority level is particularly useful in determining the programming of a DVR when a recording conflict occurs.

DVRs have a limited number of channels that can be recorded at the same time. DVRs are able to record only one or two channels simultaneously, and conflicts occur when the DVR is programmed to record or buffer more programs than the DVR can receive and process at once (e.g., two or three programs). When more programs have been scheduled to record simultaneously than the DVR can handle, the priority level designations can be used to determine which program(s) to parse for recording. If a user who has a DVR that can record two channels simultaneously receives programming instructions to record three specific programs that air at approximately the same time (or have overlapping air times), the "priority level" for each program is can, for example, be checked by digital video recorder 100. For example, a program may have four (or more) priority levels. Level 4 indicates that the program was selected directly by the user. Level 3 indicates that the program was sent to the user by an individual having high priority level assigned (as explained above) or from a chat room moderator. Level 2 indicates that a program was sent to the user by an individual who has a lower priority level. Level 1 indicates that the program was selected by the DVR using the user's stored viewing habits (as described earlier). Upon receiving the coded instructions to record the three programs having similar air times, digital video recorder 100 checks the priority level of all three programs and records (or buffers) the two programs having the highest priority level. If two or more programs have the same priority level, digital video recorder 100 can either record (or buffer) the programs based upon the order in which the commands were received or based upon the users instructions. Digital video recorder 100A prompts the user with an indication of the recording conflict and with instructions to select which of the conflicting programs to record. The user designates which of the programs to record either by using remote control 112 or by using the control panel of digital video recorder 100A. Digital video recorder 100A then records the specific program designated by the user. However, if the user does not designate which of the conflicting programs to record, digital video recorder 100A can automatically select which of the conflicting programs to record based upon the order in which the command was received, utilizing the oldest command first. In an alternative embodiment, it can utilize the newest command first.

The four priority levels indicated above are for exemplary purposes only, and any desired number of levels can be set. Furthermore, the levels need not be discrete levels but can be continuous levels. The greater the number of levels that are used, the better digital video recorder 100A is able is to properly record (or buffer) the more desirable programs. In another embodiment, partial recordings are recorded based on priority. For example, if program A runs from 10:00-10:45 AM and program B runs from 10:30-11:30 AM, either A or B would not be recorded based on its priority. The present system allows for partial program recordings. In one embodiment, the program with the higher priority is recorded in full, while the remainder of the lower priority program is recorded as well. Thus, when A has higher priority than B, A would be recorded in full, and program B would be recorded from 10:46-11:30 AM; conversely, if B has higher priority than A, then B would be recorded in full and program A would be recorded from 10:00-10:30 AM. Also, multiple factors can be used to set the levels, such as assigning a higher priority level to a program that is suggested by multiple users than to a program that is suggested by only one other user. Furthermore, a user can get suggestions from multiple sources including chat rooms, e-mails, or electronic journals, and is able to assign a priority level for each specific source. Upon receiving program instructions (i.e., program name, channel, date and time) to record, digital video recorder 100A checks the priority level assigned to the source and whether or not the instruction was received from multiple sources.

In another embodiment, a user could form a "buddy list", including individuals who have interests similar to the user. Members of the buddy list can send e-mails indicating suggestions for future programs to record to the users digital video recorder 100A. The programs are automatically added to the DVR's parsed list of programs to record and are recorded upon airing. Additionally, an e-mail can be sent to the users e-mail account, indicating that a "buddy" set digital video recorder 100 to record a future program. Only individuals on the buddy list have the ability to set another DVR to record.

A second technique for determining recommendations from members of a buddy list includes defining "degree of separation" for the purpose of making program viewing recommendations. Degree of separation is defined by counting the number of intermediaries between any one person and another. For example, if person A knows person B, and person B knows person C, than A and C are separated by two degree from each other through their common knowledge of B. In this example, a user may transmit a request to members of his or her buddy list for programming advice such as "I would like to watch a program pertaining to Low-Carb cooking, can you please suggest any programs?" This request is sent, via e-mail or any other suitable electronic format, to members of the buddy list and is then forwarded to members of their buddy lists by using email addresses associated with buddy list entries. A limit could be set limiting the number of times a request could be forwarded, for example limit the request to "three degrees". A response to the request would include the link or programming information necessary to program the DVR and information related to the degrees of separation. The user can then decide to accept or decline the suggestion based upon the program information and the information detailing the source of the suggestion. In one embodiment, the user is sent an email with an accept or decline button that generates a response back indicating the user's choice. In another embodiment, an email is generated with a Web link, one for accepting and the other for declining the suggestion.

In one embodiment, the CMD stores a buddy list and generates recommendations by searching the stored buddy list and implementing searches of buddy of buddy of buddy (to the desired degree) lists at other CMDs. In other modes of operation, the CMDs in the user community send queries to online users to trace back through the users' buddy lists step-by-step for real time verification of buddy relationships, or the CMDs trace back through the stored buddy lists to see if the recommender can be found, and if so, determine the relationship (degrees of separation) from the buddy, or a combination of these techniques with an indication to the user the relationship and verification data. The method of tracing back through a buddy list includes a user transmits a request for programming information and receives a suggestion from "person A" for a particular upcoming program event. The CMD initially checks the internally stored buddy list for person A and indicates that person is "Once Removed" if he or she is on the buddy list. If person A is not stored on the buddy list an inquiry is sent to the CMDs of the users stored on the buddy list, if person A is on found information indicating the person A is "Twice removed" is provided and/or the buddy information through which A is connected is provided. This search continues on until a predetermined limit is reached, such as "three degrees" or "four degrees", the predetermined limit may be user determined but is limited by the system to a maximum number.

In order to implement the buddy list recommendation system, it is desirable to have buddy lists that are trustworthy and that have useful recommendations. One way to help ensure a trustworthy buddy list is to limit "recommender buddies" to a fixed number, this is smaller than e-mail buddies, and to remove buddies from the recommender buddy list if there is no recent communication with the buddy.

In another embodiment, the degrees of separation are defined based upon a list of rules and the program recommendation is displayed including an indication of the presumed quality of the recommendation based upon the recommender rating. The criteria for accepting or declining a recommendation may include: recommender is on a list of trusted recommenders input by the CMD user; recommenders that are placed on a favored recommender list by the user; former favored recommender that have been deleted for not making a recent recommendation; unknown or first time recommenders; recommenders that have recommended before but whose recommendations were considered mediocre; recommenders that have been removed from the list for making poor or unsuitable recommendations; and recommenders that are excluded as "spammers" as being known to circulate poor or inappropriate recommendations. Recommendations from recommenders that have been removed from the list may be automatically blocked or may include an indication that these recommendations are questionable.

In another embodiment, an "expert" creates a list or list of recommended programs. These lists may be freely distributed, offered by equipment vendors or service providers as an incentive to buy their equipment or service, or offered for sale via the Internet, pay-per-view, or any other similar distribution means. The expert may be a movie or television critic, a subject matter specialist such as football coach, a sport commentator, a professional chef, or others with specific knowledge of particular program material, such as an actor, producer or director. For example, a fan of a football team subscribes to the coach's service for watching football games. The service includes recommendations for which game telecast to view including files or metadata comprising annotations by the coaching staff describing the play specific, formations, and logic behind the particular play call. The metadata includes control information for initiating instant replays, verbal commentary, and graphic overlays describing the plays or update game statistics.

Another example of this embodiment is that users may purchase a subscription to a service that provides a list of viewing and recording recommendations published by a celebrity or any individual whom the user wishes to emulate. For example, a user that enjoys Tom Hanks could subscribe to a service that includes a list of Rutger Hauers' favorite television programs and movies. Alternatively, the user's CMD analyzes electronically published materials that include remarks from people the user would like to emulate. For example, Rutger Hauer may comment that he was influenced by watching Robin Williams early movies, the CMD then searches for Robin Williams movies and automatically records these movies. In order for this feature to function properly, the CMD needs to acquire program information from a service provider, a web site, or some other electronic source of programming information.

In another embodiment, a user programs an address book in his or her CMD. The address book can be programmed with individuals, groups of associated individuals, or a combination of both. The address book function can also be employed by the user to automatically e-mail selected groups or individuals when the user is viewing a program of particular interest. For example, a user is a member of an association and has programmed his or her CMD with an e-mail group including the other members of the association. While the user views a program of particular interest to the association, the user's CMD automatically e-mails the programmed group of e-mail addresses that the viewed program should be viewed, buffered or recorded. The e-mail is sent either directly to the members' CMDs or to their connected PC e-mail client.

A user can designate "program types", such that designation of a program type automatically sends an e-mail to users interested in the category selected. For example, a user in a history club could designate a program as "history", such designation automatically causing the user's CMD to e-mail the program information to the other members of the history club. This designation feature simplifies the process necessary to inform selected individuals of desired programs to view.

A user can also email a "play list" or "record list" which can enable the recipient's DVR to effectively synchronize its storage to the sender's configuration. In one embodiment, an entire group of users may have their DVR's synchronize viewing. For example, in an embodiment where a cooking club were watching a recipe program, one user could schedule viewing for the group, but could further control the viewing by pausing the program so that all the group members could proceed at the same pace and discuss the program and prepare a meal in concert (e.g., while having a telephone conference and watching their DVRs in the kitchen as they prepare the meal).

Internet Web Logs (Blogs)

Blogs (Web Logs) are a popular, fast-growing phenomenon on the Internet where individuals (professionals as well as nonprofessionals) publish (usually for public view) timely insights, feelings, observations, and other thoughts. Blogs may also include discussion threads similar to a bulletin board or news group.

FIG. 6 illustrates a DVR blog 600 which is based on the concept of a blog, but focuses on issues and topics associated with DVR use and television watching in general. The DVR blog 600 includes additional functionality that enables users to share DVR settings and programs to watch and record. Specifically, this capability allows DVR users to create, annotate, and "publish" a journal of television shows that they have viewed or recorded. Also, DVR blog 600 enables a user to create a live, personal program guide that can be used to program other users' DVRs. Currently, many episodes of a program are repeated at a later time, enabling a different DVR user who reads or follows a user's blog, to program his or her DVR to record the episodes discussed in the blog. Furthermore, a user can create "virtual" channels that other users can emulate, e.g., set their DVRs to record everything that is recommended by a local newspaper's TV critic, a national critic, or some other reviewer that they respect and has similar tastes, based upon a published blog. In one embodiment, the users can "subscribe" to a multi-program link. This link may be owned by a critic etc. and may be continually updated by the links owner to vary the constituent programs, thereby causing all the subscribers to the multi-program link to have updated recordings. In one embodiment, the multi-program link has only one program, but it is updated and changed to different constituent program links over time.

Blog entries include machine readable program recommendations 610 and ratings 620 that are be used by digital video recorder 100A to influence its decision to record these programs.

The CMD can also be used to enhance the blog experience by providing to the user during blog entry creation program metadata and information about, and links to, related programs (based on its program guide database).

FIG. 6 shows a sequence of blog entries that illustrate several of the concepts incorporated in one embodiment. Blog 600 includes Entries 605 that are discussions of several television programs. In each blog entry, specific show references 610 and ratings 620 are coded to allow the CMD to find the appropriate show by comparing the reference information, which may include the date, time, channel, number, etc. to a program guide listing stored within, e.g., a DVR, and, based on the ratings and other criteria, decide whether or not to record the specified show. The rating codes are used by digital video recorder 100 to determine whether or not to record a program. If there is a conflict in recording schedule, a program having a low rating would not be recorded.

Blog 600 can be used by a user to control digital video recorder 100A. Selecting a program link of show information 610 in the Blog 600 automatically sets digital video recorder 100 to record or buffer the program indicated.

Many current DVRs allow the user to select a program to record by selecting a program entry from a menu. This program entry is encoded with both date/time information and the channel number or frequency. The DVR reads the selected entry and uses the date/time information and channel number or frequency to set the recording mode. Furthermore, the user has other recording options available when setting the recording time, such as starting the recording a few minutes early and extending the recording duration. The program link 610 of show information may include all of the information provided for a program in the selection menu. The user can also be provided with recording options, including changing the time to start recording and/or the time to stop recording.

Links 610 can be used in many other on-line modalities, including chat rooms, and in e-mails sent to or from various CMD users. A user may also send information from a remote terminal having Internet access to an e-mail recipient or a group of e-mail recipients (i.e., buddy list members). The remote terminal includes, but is not limited to, a laptop computer, a personal digital assistant (PDA), a cellular phone having internet access, or a personal computer.

In an alternate embodiment, the centralized server 200 is used to learn about group preferences and to access blogs, e-mail, or other web sites containing recommendation lists. When multiple sets of recommendations for each program are available, the server processes the recommendations to produce a refined set of priority levels for each specific program. The server can compare both the number of times a specific program is referenced and the rating 620 provided for each program. That is, if a program is only referenced a few times and rated lowly, server 200 does not forward the program information to other users' DVRs. If a program is referenced often and highly rated, the program is determined to be of common interest, and server 200 sends instructions to other users' DVRs to record the program. In addition to the forgoing example embodiments, many other forms and modes of processing recommendation data are possible and considered within the scope of this disclosure. The embodiments described herein represent only a sample of the processing modes possible.

Although exemplary embodiments have been described with regard to a DVR, any digital recording device could be used with the present invention. This includes, but is not limited to, a personal computer, a DVD recorder and a Personal Audio Recorder (PAR). PARs work in much the same way as DVRs, but are used to record audio programs, such as from demodulated FM or AM signals.

Figure 7:
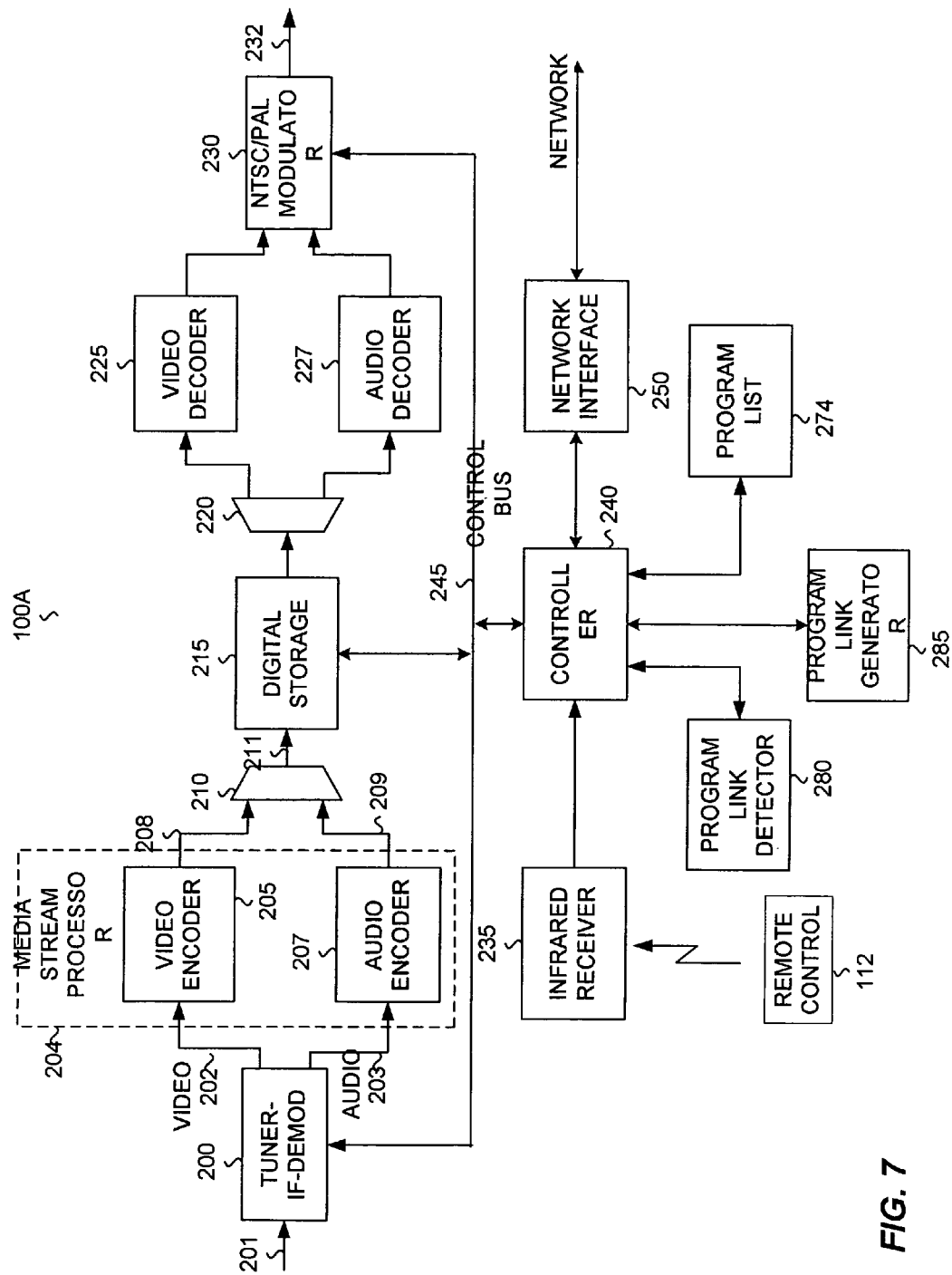
FIG. 7 illustrates an exemplary functional block diagram of a CMD that embodies the present system.

FIG. 7 is a simplified functional block diagram of Digital video Recorder 100. The particular DVR illustrated in FIG. 7 is for use with analog television broadcasts (over-the-air or CATV, for example). The antenna/cable feed 201 is input to Tuner-IF-Demod 200. Tuner-IF-Demod 200 combines the functionality of tuner, intermediate frequency (IF) processor, and demodulator. (When we refer, in this specification, to a "tuner", we are typically referring to the Tuner-IF-Demod combination.) These functions serve to tune the selected channel, filter and mix the selected channel to baseband, and demodulate the received signal into video signal 202 and audio signal 203. The channel is selected by the user through an IR (infrared) remote control (not shown) through Infrared Receiver 235 and Controller 240. Controller 240 programs the channel in Tuner-IF-Demod 200 through Control Bus 245.

Video signal 202 and audio signal 203 are processed by Media Stream Processor 204, which includes Video Encoder 205 and Audio Encoder 207. Video Encoder 205 digitizes (converts from analog form into digital form) and compresses video signal 202. Video Encoder 205 may use one of the many video compression algorithms such as those included in the standards commonly known as MPEG-1, MPEG-2, or MPEG-4, or a proprietary algorithm. Audio Encoder 207 digitizes and compresses audio signal 203. Audio Encoder 207 may use one of the many audio compression algorithms such as those included in the standards commonly known as MPEG-1 (including the algorithm commonly called MP3), MPEG-2, or MPEG-4, or another algorithm. Video Encoder 205 and Audio Encoder 207 may also encrypt the media steams to protect them from unauthorized copying. The digitized video and audio signals 208 and 209 are multiplexed in multiplexer 210 and the multiplexed signal 211 is stored in a file on Digital Storage 215 under the control of Controller 240 through Control Bus 245. Digital Storage 215 may be any fixed or removable mass storage device, including a hard disk drive, an optical disk drive, flash memory, etc.

Playback comprises retrieving of a desired media file from Digital Storage 215, and demultiplexing the retrieved signals in demultiplexer 220. The demultiplexed video and audio signals are decoded by Video Decoder 225 and Audio Decoder 227. Video Decoder 225 and Audio Decoder 227 use the appropriate decompression algorithms based on those used in Video Encoder 205 and Audio Encoder 207. Video Decoder 225 and Audio Decoder 227 may also decrypt the media signals if they were encrypted during the encoding process. The outputs of Video Decoder 225 and Audio Decoder 227 are converted to a form that is appropriate for display on Television 115 by NTSC/PAL Modulator 230. The output signals 232 of NTSC/PAL Modulator 230 may include an RF modulated composite video and audio signal as well as separate video and audio signals. Separate video signals may include a baseband composite video signal, an S-Video signal, and a component video signal. Also, HDTV signals and connectors may be employed. Audio signals may include line level analog mono or stereo audio and S/PDIF digital audio signals.

Controller 240 is responsible for managing all of the functions of Digital video Recorder 100A and is also responsible for managing the files on Digital Storage 215. Included in the management of the files is the monitoring of free storage space, removal of unused or unneeded files, and prioritization of storage operations. Controller 240 is also responsible for acquiring, formatting and displaying an Electronic Program Guide (EPG) on television 115. Controller 240 may acquire the data required for the EPG from information carried on the broadcast signal or by downloading data through Network Interface 250 as discussed above. The Network Interface 250 is implemented either through a telephone modem, or as a direct or indirect Internet connection as illustrated in FIG. 2.

The EPG displays a listing of current and upcoming programs on all of the available channels. The user navigates the EPG, searches for programs, and selects programs to view or record by using an IR remote control 260 through Infrared Receiver 235.

Referring again to FIG. 7, Digital Storage 215 has a read/write bandwidth that is sufficient, at a minimum, to effectively support simultaneous read and write operations. This allows a user, for example, to watch a previously recorded program while another program is being recoded.

The DVR 100A also includes a program list 274 which is generated by the controller and includes an identification of all the programs to be recorded. The program list 274 includes programs that have been manually selected by the user, programs that have been automatically selected by the DVR, and programs recommended by other users as described in the embodiments above. When a user wishes to recommend a program to one or more other users, he/she identifies a specific program from this list, the controller 240 retrieves the information about the program from the program list 274, generates the program link using program link generator 285 and makes the program link available to the user by sending the program link directly to the other users or to the server 200. The server 200 reviews or parses messages from users and determines if any of them include a program link. If a program link is found, it is stored in program link memory 202. From this memory, the program links are available for downloading by the other users, as discussed above.

When a user downloads a program link, the link is sent to the program link detector 280. The link is decoded and sent to controller 240. Controller 240 then reviews the program link and uses the information contained therein to update its program list 274.

The controller 240 also performs the other functions described above. For example, in some instances, instead of just a single program link, a set of links may be downloaded. The controller 240 then updates the program list with either all the programs identified by the links, or just the programs identified by the user. For this latter function, the controller or the PC 300 presents the list of links with associated programs to the user so that the user can determine what should be included in the program list. If the links also include recommendations or ratings, the user may use this information in making his selection. Alternatively, the controller 240 can select automatically which programs from the list of links are to be included in the program list based on the recommendations or the ratings.

The controller can also initiate requests to other users or to server 200 for lists of links.

In some instances the program link may include a priority code as well. The controller takes this priority code into account when updating the program list.

In another embodiment, a recommending user's CMD automatically acquires information specifying when a program mentioned in that user's recommendation will be rebroadcast, and inserts an appropriate link into the electronic communication which contains the recommendation.

In yet another embodiment, a central server automatically acquires information specifying when a program recommended in a user's electronic communication will be rebroadcast, and inserts an appropriate link into the electronic communication which contains the recommendation.

In yet another embodiment, a recommending user's CMD acquires information specifying when a program originally mentioned in that users electronic communication will be rebroadcast, subsequent to the original recommendation, and initiates an electronic communication to the user community containing a link to the rebroadcast of the recommended program.

In yet another embodiment, a central server acquires information specifying when a program originally mentioned in a user's electronic communication will be rebroadcast, subsequent to the original recommendation, and initiates an electronic communication to that same user containing a link to the rebroadcast of the recommended program.

In the previous embodiments, a user receives recommendations from known sources, such as, group members, e-mail suggestions, or hyper-links in a blog. However, recommendations may be received from unknown sources necessitating a system to provide insightful suggestions.

In one embodiment, the CMDs are used to suggest programming automatically without recommendations from community members or buddy-list members. In this embodiment a list of most-viewed programs is compiled and the list is propagated as recommendations to all authorized viewers. Each individual CMD is monitored to accumulate statistics on the number CMDs that view or record all programs broadcast over a pre-determined or user-defined interval of time and the headband recommends the "top n" programs for viewing or recording. The user may select a value for "n" or "n" may be a predetermined value stored in the CMD. The headend can determine the top n within seconds after the start of a program, or even before the start of the program, assuming that the DVRs are tuned to the program a few seconds before the start of the program, and the data can be propagated to the CMDs enabling the users to watch the most popular programs live or record for future viewing. The system can include a service that provides a synopsis of what has transpired during the beginning of a program to those who may have started viewing or recording the program after the start of the program. The synopsis may be presented during a "program intro segment" (such as during the credits, during a commercial break, displayed when the user pauses the program, or on-screen in the form of closed-caption data or a "crawl".

Members of a community that use the "instant programming ratings" described above, can view or record the programs that are currently the most popular programs under community control. If the community collectively decides that a program is not interesting, as reflected by members changing programming or rating a program poorly, a passive viewer's CMD can automatically retune the DVR to a more interesting program or indicate to the passive viewer that a more interesting program is available. For example, subscribers of "NFL Sunday Ticket" have access to all of the current NFL games that are broadcast simultaneously. Often, while one football game is in an uninteresting moment, such as half-time or time-out, another game has exciting action. The "instant programming ratings" can be used to "community-surf" viewers of the "NFL Sunday Ticket" package to the most exciting broadcast game during a lull in the game the subscriber is viewing. In one embodiment, the community's ad viewing habits are tracked and aggregated into demographic sub groupings. This allows the tracking of ads preferred by part of the community to be targeted at other members of the community with greater demographic efficacy.

In another embodiment, program recommendations are generated using a collaborative filtering model, "people who like or purchased product 'a' also like or purchased product 'b'. In this embodiment, the headend tracks programs viewed or recorded and recommends the next most popular choices to other users. This embodiment functions in the same manner as the "instant programming ratings" described above with the additional feature the recommendations are based upon groups having similar viewing habits. For example, it may determine that people who watch cooking shows also enjoy gardening shows. A user that frequently watches cooking shows would receive recommendations on the most watched gardening shows. The collaborative filtering model can be extended to include many shows. For example, people who watch cooking shows, gardening shows and "Sesame Street" may also enjoy romantic comedies.

The programming choices recommended to the CMD using the collaborative filtering model may take into account the program genre, subject matter, actors, actresses, director, or use any other classification scheme that may limit the possible recommendations, enabling better program filtering. For example, a user enjoys various programming including some police dramas and the user's CMD stores the user's viewing habits and transmits this information to the headend. The headend receives the information detailing the user's viewing habits and determines specific police dramas that user may enjoy and presents recommendations to the user's CMD suggesting the user view two new police dramas.

In another embodiment, the CMD uses a learning system that is applied to program information to provide recommendations to the user. In this embodiment, a website is provided by an individual or group and the CMD has access to the program descriptions. The website may be provided on a fee-based access, provided to owners of particular hardware, provided to subscribers of a particular service provider, or provided for free. The user is presented with a number of program descriptions in the form of capsule descriptions, reviews, scripts, or even a program segment, and is asked to express interest (by pushing the "thumbs up" key) or lack thereof (by pushing the "thumbs down" key). The user decisions indicating interest level or input into a learning system, for example a Bayesian filter, and the learning system is trained by utilizing the user ratings to "learn" the types of programming that the user likes and dislikes. The trained learning system can then be used to screen descriptions received by the CMD and provide recommendations to view or record programs that will be of interest to the user. In one embodiment, the CMD has active script that causes the CMD to visit web sites containing content descriptions, use the learning system to select programs of interest to the user, and acquire a set of recommendations for viewing and/or recording. In one embodiment, the CMD receives recommendations for programming from a source such as buddy, and implements the steps previously described to determine whether the suggestion should be provided to the user.

In yet another embodiment, the CMD or headend utilizes software to classify a set of program descriptions that are of potential interest to the user. Classification provides a set of categories each of which has been divided to include a hierarchical set of "folders" or subcategories that the user can peruse to select programming. For example, the category of "Cartoons" may include subfolders that contain subcategories, such as adult, anime, computer generated, Disney, superheroes, Warner-Bros and/or the like, and each subfolder contains the programming information for related programs. For example, the adult subcategory may contain programs such as Futurama, the Simpsons and South Park. The user can use a graphical interface to search the folders, similar to using Windows to find a program file, or may enter key words that lead directly to the appropriate category. If the user searches for "police dramas" containing "trial scenes" the CMD searches through the categories, locates the "court scene" subfolder, and provides the information to the user or automatically records the program.

The many features and advantages of the invention are apparent from the detailed specification. Thus, the appended claims are intended to cover all such features and advantages of the invention which fall within the true spirit and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a community of networked users, each user being associated with a respective consumer media device (CMD), wherein a first user is related through a chain of several intermediate users to a second user, the first and second users being separated by a degree of separation defined by the number of intermediate users in said chain between said first and second users, a method of presenting a program to the first user comprising:
   receiving an electronic communication by the first user through the respective first CMD from the second user said communication including a recommendation from the second user, said first CMD having a program list listing programs to be viewed and/or recorded;
   making a determination by said first CMD as to whether to present said program to said first user based on said degree of separation; and
   updating said program list using said respective degree of separation.

2. The method of claim 1, further comprising the step of recording said program by a DVR.

3. The method of claim 1, wherein the electronic communication includes an e-mail sent by said second user through a respective second CMD.

4. The method of claim 1, wherein the electronic communication includes an e-mail sent by a peripheral e-mail client server connected to the respective CMD.

5. The method of claim 1, wherein the electronic communication includes a transmission of a program link posted on an electronic publishing site.

6. The method of claim 5, wherein the electronic publishing site is a blog.

7. The method of claim 1, wherein the electronic communication includes a rating code.

8. The method of claim 1 further comprising a list of CMDs with respective users for said first CMD, each CMD on said list having a respective degree of separation.

9. The method of claim 8 wherein said degree is incorporated into said list.

10. The method of claim 8 further comprising sending messages from said first CMD to CMDs on said list, receiving responses from said CMDs from said list and determining the degrees of separation based on said responses.

11. The method of claim 10 further comprising incorporating in said messages a threshold for said degree of separation, wherein responses to messages between CMDs separated by at least said threshold are ignored.

12. The method of claim 1 further comprising ignoring electronic signals from CMDs having a degree of separation exceeding a predetermined threshold.

13. The method of claim 1 wherein said degree of separation is one more than the number of intermediate users between any two respective users.

14. The method of claim 1 wherein said users are members of a buddy system with each user being a buddy of at least one other user.

15. A method for sharing a plurality of program links on a plurality of networked CMDs, said networked CMDs being associated with a corresponding group of users, any two user of said group being separated by a respective degree of separation defined by the number of intermediate users relating said users to each other, the method comprising:
   publishing a list of program links on an electronic publishing site, each program link identifying a program to be broadcast;
   downloading said list at one CMD as a local list; and
   updating a program list at said CMD to include at least one program from said local list, said program list identifying programs to be viewed or recorded by said one CMD; wherein said programs of said program list are graded based on recommendations from at least some of said users of said group and the respective degree of separation between said some of said users and the user of said one CMD.

16. The method of claim 15, wherein the programming list is provided to one or more users who pay a fee.

17. The method of claim 15, wherein publication of program links occurs in a limited membership publishing site.

18. The method of claim 15, wherein the limited membership publishing site is a chatroom open to members only.

19. The method of claim 15, wherein each program link is provided by a user selection.

20. The method of claim 15, wherein the CMDs search a network to find published lists including recommendations from a user-specified person.

21. The method of claim 15, wherein each program link is provided by one or more experts.

* * * * *